United States Patent [19]

Mori

[11] Patent Number: 4,841,729
[45] Date of Patent: Jun. 27, 1989

[54] THRUST FORCE REDUCTION DEVICE FOR TORQUE CONVERTER

[75] Inventor: Mituyoshi Mori, Hirakata, Japan

[73] Assignee: Kabushiki Kaisha Daikin Seisakusho, Osaka, Japan

[21] Appl. No.: 146,165

[22] PCT Filed: May 11, 1987

[86] PCT No.: PCT/JP87/00290

§ 371 Date: Dec. 16, 1987

§ 102(e) Date: Dec. 16, 1987

[87] PCT Pub. No.: WO87/06990

PCT Pub. Date: Nov. 19, 1987

[30] Foreign Application Priority Data

May 13, 1986 [JP] Japan .................. 61-109785

[51] Int. Cl.⁴ .......................................... F16D 33/00
[52] U.S. Cl. .......................................... 60/361; 60/330
[58] Field of Search .................. 60/330, 361, 362

[56] References Cited

U.S. PATENT DOCUMENTS

| | | | |
|---|---|---|---|
| 3,360,935 | 1/1968 | Schneider | 60/361 |
| 3,677,003 | 7/1972 | Schneider | 60/361 X |
| 3,721,090 | 3/1973 | Ahlen | 60/362 |
| 4,049,093 | 9/1977 | Vukovich et al. | 60/361 X |
| 4,671,062 | 6/1987 | Ohkubo | 60/362 |

FOREIGN PATENT DOCUMENTS

| | | | |
|---|---|---|---|
| 1040509 | 10/1978 | Canada | 60/361 |
| 305509 | 5/1955 | Switzerland | 60/330 |
| 413799 | 7/1934 | United Kingdom | 60/330 |

Primary Examiner—Robert E. Garrett
Assistant Examiner—Mark A. Williamson
Attorney, Agent, or Firm—Armstrong, Nikaido, Marmelstein, Kubovcik & Murray

[57] ABSTRACT

The present invention relates to a thrust force reduction device for torque converter comprising a pump rotor, a turbine rotor connected to a turbine shaft and disposed opposed to the pump rotor and at least one stator rotor and a fixed cylindrical shaft fitted to a boss of the pump rotor; characterized by that a seal element is fixed to the turbine shaft and produces a thrust reactional force so as to cancel a thrust force which occurs in the torque converter; the seal element facing a fluid chamber receiving pressurized hydraulic fluid exhausted from the turbine rotor, and the seal element being disposed liquid tight between the turbine shaft and a power input guide to the turbine from the engine, to which the turbine is connected.

4 Claims, 2 Drawing Sheets

THRUST FORCE REDUCTION DEVICE FOR TORQUE CONVERTER

TECHNICAL FIELD

This invention relates to a thrust force reduction device for torque converter, and espcially to device for reducing thrust force produced by fluid flow in the torque converter.

BACKGROUND ART

FIG. 3 shows a schematic view of a prior art type torque converter. In FIG. 3, numeral 100 is a casing, fluid 102 flows inside the casing 100 by prescribed pressure P. A turbine shaft 104 fits rotatably in casing 100, and a sealing part 106 keeps on shaft 104 casting 100 in liquid-tight condition.

In the prior art showing FIG. 3, a thrust force occurs in the torque converter, and the thrust force presses the casing 100 in the direction of arrows A.

DISCLOSURE OF THE INVENTION

An object of the invention is to provide a thrust force reduction device for torque converter, which can reduce the thrust force as it occurs in the torque converter.

COMPOSITION OF THE INVENTION

(1) Technical measure

The present invention relates to a thrust force reduction device for torque converter comprising a pump rotor connected to the crankshaft of an engine, a turbine rotor connected to a turbine shaft and disposed to oppose the pump rotor, and having at least one stator and a fixed cylindrical shaft fitted to a boss of the pump rotor in liquid-tight condition; characterized by that a seal element is fixed to the turbine shaft and produces a thrust reactional force which cancels the thrust force which occurs in the torque converter; the seal element is disposed to face a fluid chamber which receives hydraulic fluid exhausted from the turbine rotor, and the seal element is disposed between the turbine shaft and the engine crankshaft, in liquid-tight condition.

(2) Function

A hydraulic force is received by the seal element which produces thrust reactional force which acts in a direction to cancel the thrust force.

BEST MODE FOR CARRING OUT THE INVENTION

Figure 1:
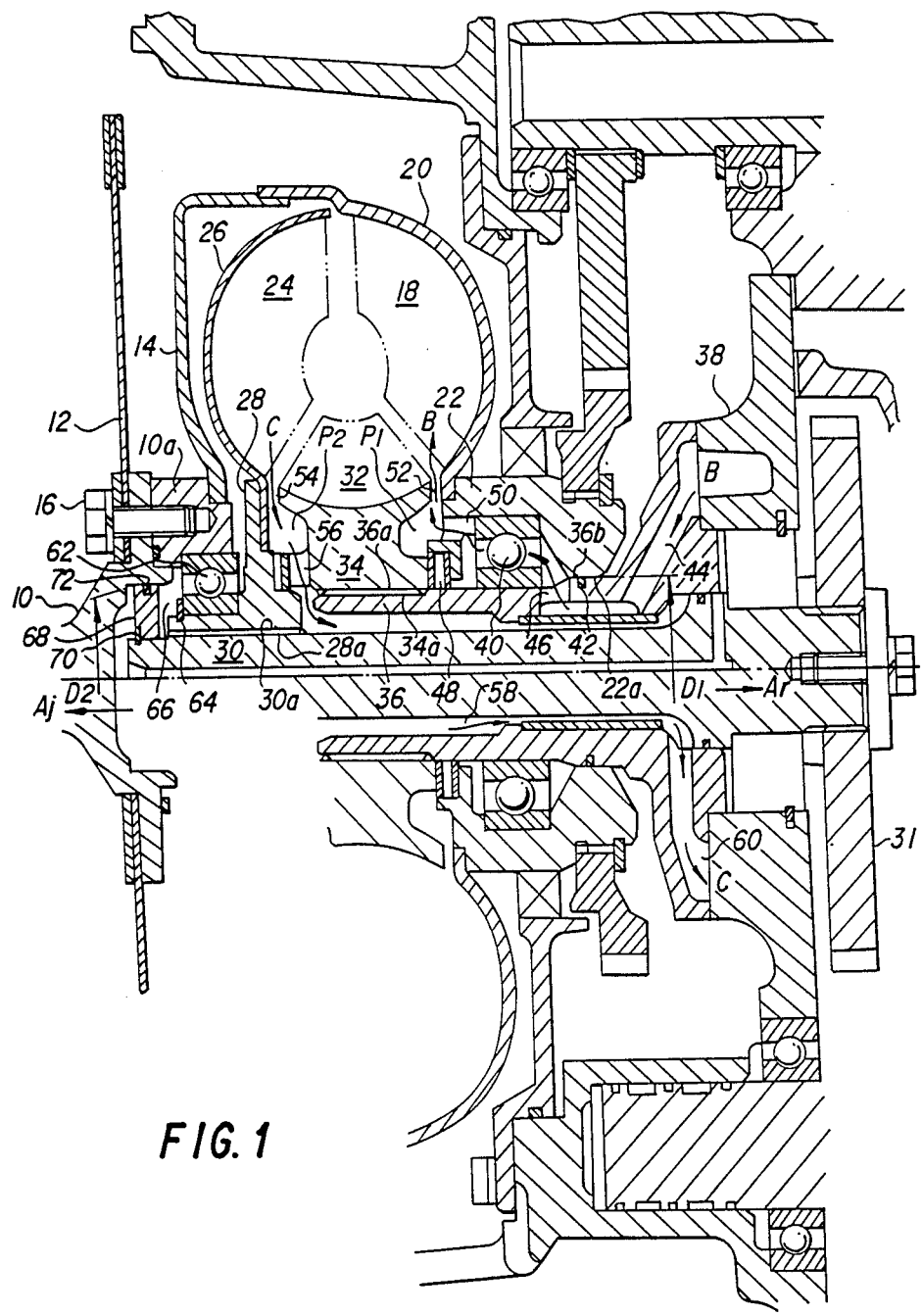
FIG. 1 is a partly sectional fragmentary view of a torque converter with the device of the present invention.

In FIG. 1 shows a three-element one-stage type torque converter to which the present invention is applied for an industrial or architectural vehicle, for example, an numeral 10 is an input guide. This input guide 10 connects to a flywheel, not shown, by a thin-disc shaped flex-plate 12(flexible plate).

A front cover 14 is provided so as to oppose to the flex-plate 12, then the front cover 14, the input guide 10 and the flex-plate 12 are fixed by a bolt 16. The front cover 14 connects to a pump shell 20 of a pump rotor 18 at an outer-peripheral part. A inner-peripheral part of the pump shell 20 is welded on a pump hub 22.

A turbine rotor 24 is provided so as to oppose to the pump rotor 18, a turbine shell 26 of the turbine rotor 24 is fixed to a turbine hub 28 at inner-peripheral part. Inner spline teeth 28a are formed on the turbine hub 28, the inner spline teeth 28a are fitted to outer spline teeth 30a of a turbine shaft 30. A power-output gear 31 is fixed to the turbine shaft 30 at the right end of the turbin shaft 30.

A stator 32 is installed between the pump rotor 18 and the turbine rotor 24, inner spline teeth 34a are formed on a boss 34 of the rotor 32. These inner spline teeth 34a are fitted to outer spline teeth 36a of a fixed cylindrical sleeve 36. The fixed cylindrical sleeve 36 connects to a bulk head 38 which connected to the housing.

A bearing 40 is interposed between the fixed cylindrical sleeve 36 and the pump hub 22. To the right of and near by the bearing in FIG. 1, the fixed cylindrical sleeve 36 is provided with seal ring 42. Therefore, an inner surface 22a (its diameter is D1) of the pump hub 22 fits onto an outer surface 36b of the fixed cylindrical sleeve 36 rotatably in liquid-tight condition.

An oil passage 44 is bored in a body of the fixed cylindrical sleeve 36, and a left end of the oil passage 44 connects through to a hole 46. A thrust roller bearing 48 is interposed between the pump hub 22 and the boss 34, a hole 50 is bored in the upper part of the pump hub 22 above the thrust roller bearing 48. Therefore, the hydraulic fluid is adapted to flow through the hole 46, the bearing 40, the hole 50 and a passage 52 from the oil passage 44.

A part of the hydraulic fluid flows to the turbine rotor 24 from the pump rotor 18, the part of the hydraulic fluid is exhausted out a passage 60 from a passage 54, a hole 56 and a passage 58 as shown by arrow C.

A bearing 62 is installed between the turbine hub 28 and a boss 10a, the bearing 62 is secured to the turbine hub 28 by means of a snap ring 64. A seal element 68 is disposed on the left of the bearing 62 in the drawing, and a chamber 66 separates the seal element 68 from the bearing 62. The seal element 68 is formed to approximately annular shape, the seal element 68 is secured to left end of the turbine shaft 30 by means of a snap ring 70. The seal element 68 is provided on its outer surface with a seal ring 72, this seal ring 72 keeps liquid tight condition between the seal element 68 and the input guide 10.

Further, diameter D2 of the seal element 68 can adjust suitably corresponding to hydraulic pressure P2 which transmits to the chamber 66 from the passage 54 and hydraulic pressure P1 in the passage 52.

The operation is described hereunder. First, a hydraulic force toward arrow Ar acts on the fixed cylindrical sleeve 36b (diameter D1), the hydraulic force is accompanied by a pressure P1 of hydraulic fluid which flows into the pump rotor 18 along arrow B.

On the other hand, a hydraulic force toward arrow Aj acts on the seal element 68(diameter D2) which is installed at left end of the turbine shaft 30, the hydraulic force is accompanied by a pressure P2 of hydraulic fluid exhausted from the passage 54. This hydraulic force of the arrow Aj is approximately as large as the hydraulic force in the direction of the arrow Ar, the hydraulic forces act in opposite directions, and the forces cancel each other.

Figure 3:
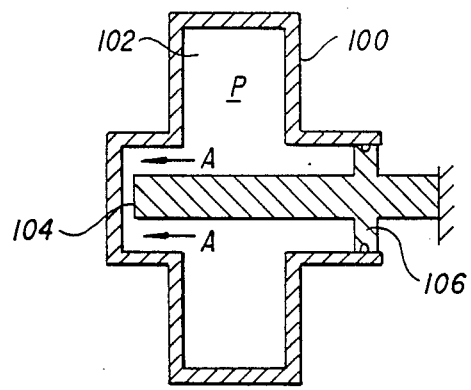
FIG. 3 is a schematic illustration of a prior art torque converter.
Figure 2:
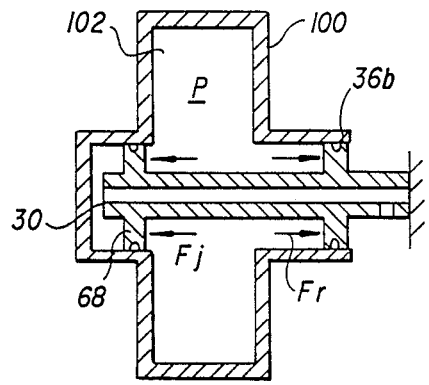
FIG. 2 is a schematic illustration of the structure in FIG. 1.

Therefore, in FIG. 2 which shows a schematic view of the torque converter of FIG. 1, a hydraulic force Fr occurs on the fixed cylindrical sleeve 36b toward the right hand in the drawings. A hydraulic force Fj occurs on the seal element 68. Hydraulic force Fr and hydraulic force Fj cancel each other. The thrust force of prior art showing in FIG. 3 is reduced.

EFFECT OF THE INVENTION

As described above, in the thrust force reduction device for a torque converter according to the present invention, turbine shaft 30 is provided at its left end with the seal element 68, so as to cancel the hydraulic force Fr on the fixed cylindrical sleeve 36b by means of the hydraulic force Fj(FIG. 2) on the seal element 68. The thrust force in the casing 100 is reduced.

I claim:

1. A thrust force reduction device for a torque converter comprising a pump rotor to which is transmitted engine power, a turbine rotor connected to a turbine shaft, said turbine rotor being disposed opposite to said pump rotor, and at least one stator, a fixed cylindrical shaft fitted to a boss of said pump rotor; characterized by that a seal element is fixed to said shaft for producing a thrust reaction force canceling the thrust force occurring in the torque converter; said seal element facing a fluid chamber receiving pressurized hydraulic fluid exhausted from said turbine rotor and forming a fluid tight connection between said turbine shaft and a power input guide to said turbine from the engine to which said turbine is power connected.

2. A thrust force reduction device for a torque converter as set forth in claim 1, in which said seal element is annular shaped and secured to an end portion of said turbine shaft by means of a snap ring, said snap ring being installed between said seal element and said power input guide power connecting said turbine to said engine.

3. A thrust force reduction device for a torque converter as set forth in claim 1, in which said power input guide power connecting said turbine to said engine includes an approximately cylindrical shaped chamber and said seal element contacts an inner surface of said input guide chamber and forms a liquid-tight seal therewith.

4. A thrust force reduction device for a torque converter comprising a pump rotor to which is transmitted engine power, a turbine rotor connected to a turbine shaft, said turbine rotor being disposed opposed to said pump rotor, and at least one stator, a fixed cylindrical shaft fitted to a boss of said pump rotor; characterized by that a seal element is fixed to said turbine shaft for producing a thrust reaction force canceling the thrust force occurring in the torque converter; said seal element facing a fluid chamber receiving pressurized hydraulic fluid exhausted from said turbine rotor and forming a fluid tight connection between said turbine shaft and a power input guide to said turbine from the engine to which said turbine is power connected, in liquid-tight condition; said seal element being approximately annular shaped and being secured to an end portion of said turbine shaft by a snap ring, seal ring on said seal element between said seal element and said power input connected guide; said seal element being disposed at an end portion of said turbine shaft nearest to said engine connected power guide.

* * * * *